(12) United States Patent
Glenn, III et al.

(10) Patent No.: US 6,606,544 B2
(45) Date of Patent: Aug. 12, 2003

(54) ELECTRONIC FLIGHT KIT AND METHOD

(76) Inventors: Floyd A. Glenn, III, 211 East Rd., Doylestown, PA (US) 18901; Charles Barba, 2431 Hillock Ct., Lansdale, PA (US) 19446; Edward Popp, 216 Candlewood Way, Harleysville, PA (US) 19438; Jason Donmoyer, 700 Lower State Rd., Apt. 25B1, Horsham, PA (US) 19454; Serge Schremmer, 858 Village Cir., Blue Bell, PA (US) 19422

( * ) Notice: Subject to any disclaimer, the term of this patent is extended or adjusted under 35 U.S.C. 154(b) by 0 days.

(21) Appl. No.: 10/026,049

(22) Filed: Dec. 21, 2001

(65) Prior Publication Data

US 2002/0165647 A1 Nov. 7, 2002

Related U.S. Application Data

(60) Provisional application No. 60/287,807, filed on May 1, 2001.

(51) Int. Cl.$^7$ .................................................. G06F 7/00
(52) U.S. Cl. ................................ 701/3; 701/14; 701/24; 244/75 R (58) Field of Search ........................... 701/1, 3, 14, 16, 701/24; 244/75 R, 158 R (56) References Cited

U.S. PATENT DOCUMENTS

| 4,787,053 A | 11/1988 | Moore |
| 4,811,245 A | 3/1989 | Bunker et al. |
| 6,441,773 B1 * | 8/2002 | Kelly et al. .................. 342/26 |

* cited by examiner

*Primary Examiner*—Gertrude Arthur
(74) *Attorney, Agent, or Firm*—Schnader Harrison Segal & Lewis LLP (57) ABSTRACT

A flight kit having a process and a set of software tools for: marking up and restructuring of flight information content such as manuals, checklists, aerodynamic data, and alerting information; converting and storing this content in an electronic form; dynamically generating a user interface based on the specific data; and delivering this to a flight crew. The flight kit can provide remote data updates and management of flight kit applications via Internet connectivity.

44 Claims, 4 Drawing Sheets

ELECTRONIC FLIGHT KIT AND METHOD

CLAIM OF PRIORITY

This application is related to and claims priority from co-pending U.S. Provisional Application Serial No. 60/287,807, having a filing date of May 1, 2001 and entitled Chief Kit, the disclosure of which is incorporated herein by reference.

FIELD OF THE INVENTION

The invention relates to electronic flight information management systems.

BACKGROUND OF THE INVENTION

Rapid identification and mitigation of mechanical faults is a crucial priority in both the military and civil aviation communities. The speed and accuracy with which a pilot can detect, diagnose, corroborate, and respond to mechanical faults have large effects not only on safety but also on the ability to complete the mission, especially in military aircraft. In the past decade, research has addressed this safety issue on two fronts—advanced mechanical diagnostics and aircrew aiding. This application is based solely on aircrew aiding and the linkage of aiding information to specific fault alerts generated from other systems.

Significant progress has been made in the field of mechanical diagnostics. New systems designated as Health and Usage Monitoring Systems (HUMS) have continued to mature and have increasingly been integrated into operational aircraft over the past decade.

HUMS utilizes new sensors to provide critical information for maintainers on the presence of potential mechanical faults which may not be detected by current Warning Caution Advisory (WCA) systems. WCA systems generally consist of rows of warning lights which provide a binary (i.e., light on or light off) indication of a potential problem. HUMS has been developed and offered exclusively as a maintainer application rather than an aircrew aiding system. HUMS generates large, incompressible quantities of data and tends to be focused on specific mechanical components rather than on fault scenarios that would be relevant to aircrew decisions.

Pilot alerting, via existing WCA systems or a new HUMS system, provides only an indication of a potential mechanical fault. Once the pilot is alerted, he or she must quickly understand the nature of the fault, assess its impact on safety of flight, decide on a course of action, and initiate corrective actions. Such sequences of actions have been incorporated into Navy (as well as other uniformed service) doctrine and is embodied in all Naval flight manuals designated as NATOPS (for Naval Air Training and Operating Procedures Standardization). NATOPS training is paramount for all Navy aviators and requires memorization of much of the information contained in the operator's manual. To offset potential memory errors, NATOPS Pocket Checklists (PCL) are used in-flight. The PCL contains normal, special, and emergency checklists in the form of quick reference steps to assist the pilot in performing the correct procedures during normal and emergency situations. During emergency situations, time pressure, workload, and stress all increase, thus creating a need for aircrew aiding.

In civil aviation, less standardization of flight manuals and checklist exists. Individual airlines have been given control (by the Federal Aviation Administration or FAA) to maintain documentation and develop procedures for in-flight use. Great differences existed between the major US airlines in terms of flight manuals and checklists but all airlines are accountable to and must seek approval from the FAA.

Electronic checklists have been introduced in some recent commercial aircraft, such as the Boeing 777 and the Airbus A330/A340. These advanced aircraft also offer integrated aircraft status information systems (the Airplane Information Management System, AIMS, for the Boeing 777, and the Electronic Centralized Aircraft Monitor, ECAM, for the Airbus A330/A340). United Airlines has recently developed a system called the Electronic Flight Bag (EFB) which provides electronic access to flight manuals, but not including electronic checklists. None of these existing systems provides a complete integrated information management system; rather, they merely provide components.

The concept of providing an information management system in the cockpit seems a natural evolution of paper manuals and checklists. Integration of these data into a computer-based form also offers the infrastructure for communication with advanced diagnostic systems as well as future applications such as intelligent agents and intelligent embedded training.

The linkage of electronic checklists to diagnostic systems raises many research issues in addition to the natural concerns about diagnostic system reliability and efficacy. Research and guidelines for the development of electronic versions of aircraft flight manuals have, however, been slow to appear. Outside of our own research program, we have identified only one prior research program in this area. A NASA research effort in the early 19990s addressed the fundamental issues of human factors of flight deck checklists and was followed by two experimental studies concerning the human performance aspects of electronic checklists. Although this NASA program has provided valuable guidance for the development of flight deck checklists and their electronic implementation, there are many empirically unresolved issues in checklist design for aircraft cockpits. For elements of flight manuals beyond the checklists, no empirical guidance reported in any publications has been found.

SUMMARY OF THE INVENTION

The inventive flight kit is a process and set of software tools for:

1. Marking up and restructuring of flight information content such as manuals, checklists, aerodynamic data, and alerting information;
2. Converting and storing this content in an electronic form, such as XML;
3. Dynamically generating a user interface based on the specific data;
4. Delivering this data in a variety of ways to the flight crew of fixed wing aircraft/rotorcraft, both in-flight and on the ground using a stand alone software application capable of running under multiple operating systems and
5. Providing remote data updates and management of all fielded flight kit applications via Internet connectivity, via a multi-tiered client/server infrastructure.

DESCRIPTION OF THE DRAWINGS

The invention is best understood from the following detailed description when read with the accompanying drawings.

DETAILED DESCRIPTION OF THE INVENTION

Embodiments of the present invention provide an electronic flight kit. The flight kit is a comprehensive product for the design, development and implementation of computer-based cockpit information management systems, and lends itself to being a portable/wearable unit. The flight kit encompasses three major components; a detailed information analysis methodology, a complex content representation management format, and an extensible and flexible software infrastructure. The three flight kit components (i.e., method, format, and software) are integrated into a coherent set of tools hereafter referred to as the flight kit Integrated Development Environment (IDE). The flight kit IDE is used to structure existing flight kit content such as manuals, emergency procedures and landing plates, and generate an executable software application which can be used as a standalone hand-held or wearable cockpit information management aid. Specifically, the flight kit can provide electronic flight manuals, electronic checklists, aerodynamic data charts and calculators, pen-based electronic note taking and form completion, fault alerting displays, mechanical performance data trend displays, and a direct link between fault information and flight manual or checklist information via an aircraft's monitoring system such as a digital data bus. The flight kit and its associated update server also provide the ability to perform remote updates via a network connection to insure the integrity and version control of both the flight kit application and its data.

Embodiments of the invention are concerned with any tutorial text describing how aircraft subsystems and components operate; presentation of aircraft performance data and component specifications via tables, nomograms, and graphics; and detailed explication of aircrew responsibilities and procedures.

Figure 1:
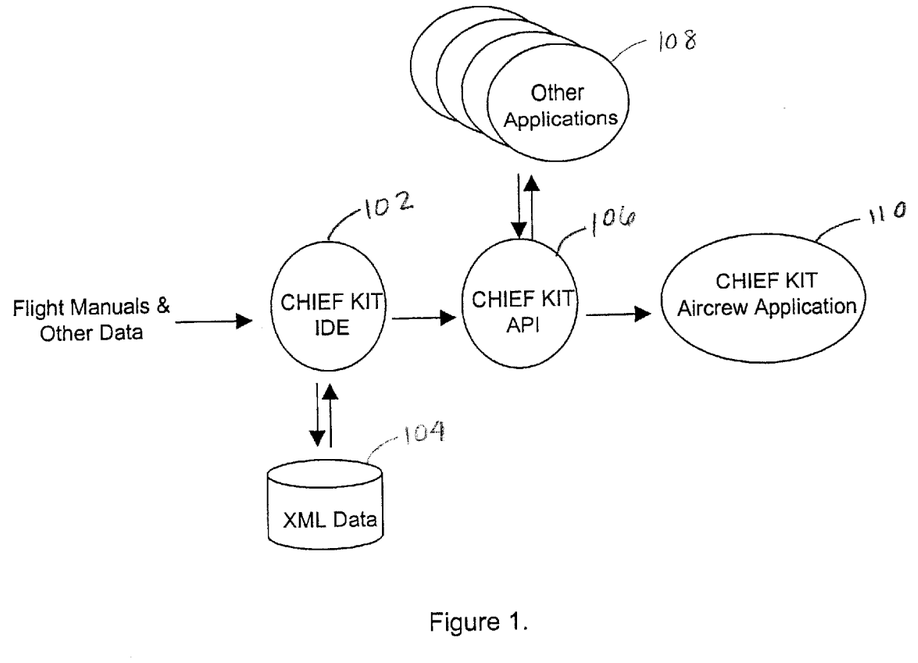
FIG. 1 depicts a high-level process flow diagram according to an illustrative embodiment of the invention.

FIG. 1 depicts a high-level process flow diagram according to an illustrative embodiment of the invention. The process is embodied in a set of software elements and tools collectively referred to as the flight kit IDE which enable the markup, storage, delivery, and navigation of the flight manual and other information (collectively, the "content"), and which is used to dynamically generate the ultimate flight kit software application and data set for a particular aircraft. The flight kit IDE is depicted as 102 in FIG. 1. The resultant aircraft specific flight kit software application provides a comprehensive set of flight information in an integrated information management system which can be used by flight crews to access information using custom features designed specifically for aircrews. The flight kit preferably represents the content it is managing via the XML language, as shown by item 104, which permits advanced access and navigation mechanisms, for example, hyperlinks, indexing, cross referencing, and dynamic display variations, as well as permitting the data to reconfigure the underlying software. Currently, similar systems, which rely on HTML, PDF, or optically scanned data (in a graphics format), cannot achieve this level of functionality. The flight kit can also provide methods for the organization and access of information which is not intrinsic to the flight kit. The flight kit application programming interface (API) 106 is a unique language, which provides the capability for programmatic connectivity between the flight kit and any other software application 108 present on the host computer. This allows the flight kit to provide organization of and an efficient user interface for any software and information, which may be of use to aircrew. This organizational capability is a major feature for in-flight applications 110 where normal computer use (i.e., operating system navigation) may be too time consuming.

The flight kit software application was developed in the JAVA programming language (currently JDK 1.3). The user interface is based on the JAVA Foundation Classes (JFC commonly referred to as Swing). A key feature of the flight kit application is its ability to dynamically regenerate its own user interface at runtime. The user interface is based on the data set, which is present for display on a specific the flight kit application. All flight kit data are preferably represented as XML, which affords the opportunity to encode structure as well as data within a data file. At runtime (if the flight kit has detected a change in its current data state), the flight kit application will parse some or all of its data and automatically regenerate its user interface to match its data. The user interface consists of a large collection of menus, buttons, and directory tree structures. The above operation is automatic and requires no user interaction. The significance of this process is that the same flight kit application version can be used to display many different data sets (e.g., 737, 747, or SH-60R flight manual data). These various version combinations of application software and data may have very different appearances to the user but can all share the same underlying software code.

Figure 2:
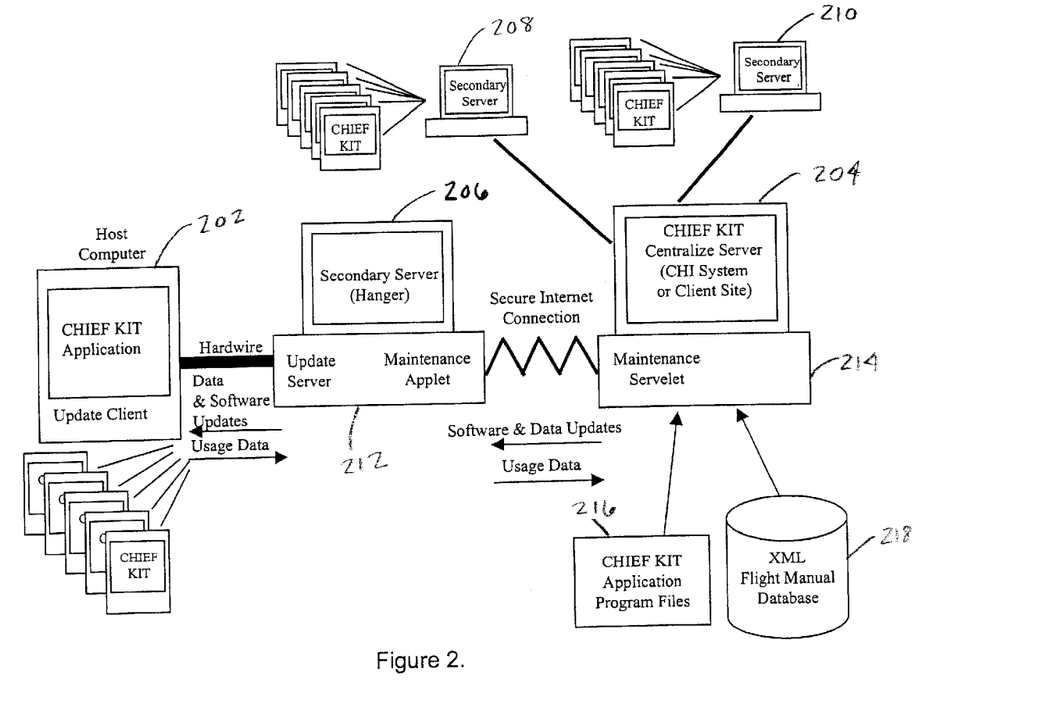
FIG. 2 depicts a flight kit remote update architecture according to an illustrative embodiment of the invention.

FIG. 2 depicts a flight kit remote update architecture according to an illustrative embodiment of the invention. The flight kit application is fielded in step 202. It is then tracked throughout its lifecycle. Tracking is performed automatically by a multi-tiered client/server management system encompassing, for example, an update server 212, a centralized server 204, secondary servers 206, 208 and 210, and maintenance servelet 214. Flight kit application program files 216 and XML flight manual and other content 218, are provided to the server system. The main purpose of tracking and update process management is to insure that the version of flight manual data is tightly controlled. Remote updating also affords the opportunity to continuously and automatically update the flight kit application software. A third benefit of this process is the ability to record and track, usage data which can be analyzed to provide a basis for continuous improvements to the system.

The flight kit electronic content conversion process is an automated process that takes an electronic copy of a document (e.g., technical manual, pilot cockpit checklists, etc.) and converts it into various types of markup files (e.g., XML, XSL, and HTML) using a generic conversion software application. These files are then processed by a JAVA application to construct a user interface structure, and to populate the interface with document content.

Figure 3:
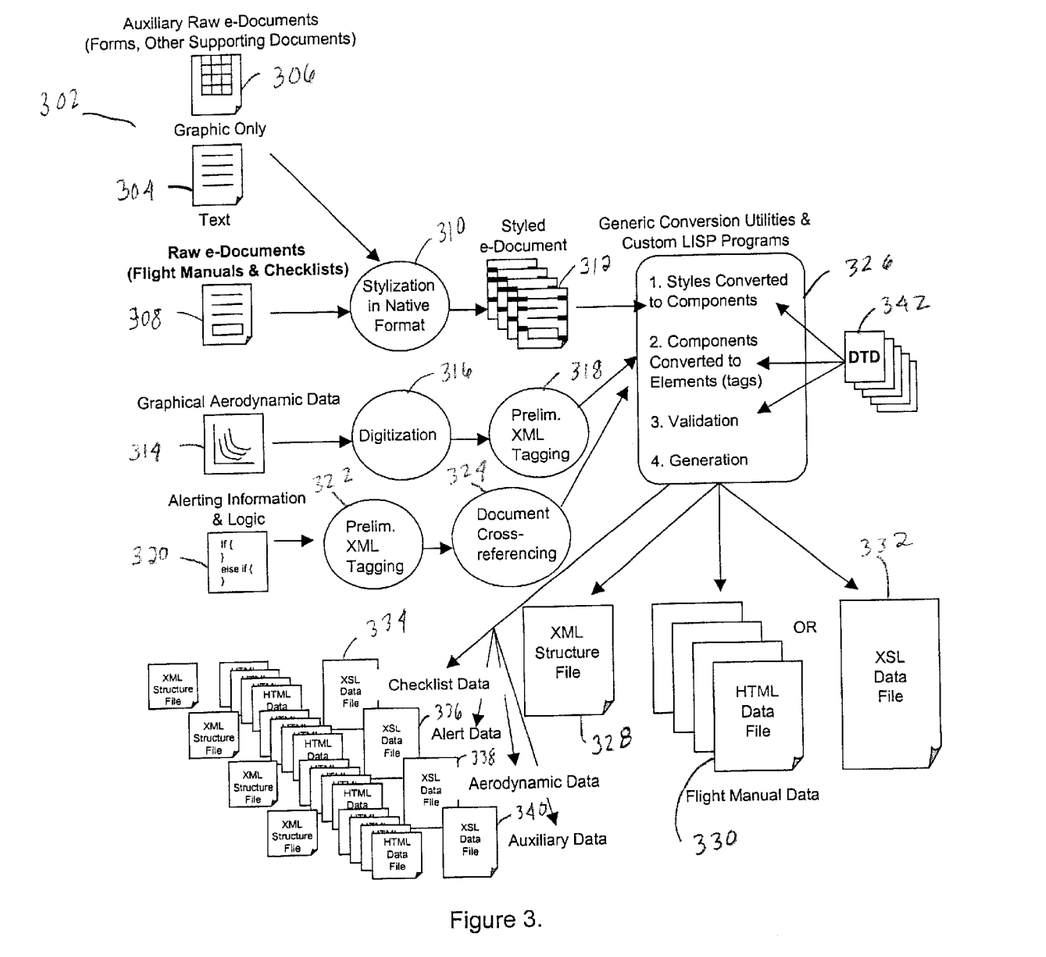
FIG. 3 depicts a content conversion process flow according to an illustrated embodiment of the invention.

FIG. 3 depicts a content conversion process flow according to an illustrated embodiment of the invention. Prior to the conversion process, flight information content is marked up and restructured. Marking up and restructuring proceed as follows: auxiliary raw e-documents 302, including text 304 and graphics 306, and raw e-documents 308, such as flight manuals and check lists, are stylized in native format, resulting in styled e-documents 312. Graphical aerodynamic data 314 is digitized in step 316, and then preliminarily tagged in step 318. Alerting information and logic 320, is preliminarily tagged in step 322. Document cross-referencing is then performed in step 324. Flight information content is then ready to be converted in step 326.

Prior to conversion, document information is structured creating document type definitions 342. Conversion 326 then proceeds by converting styles to components, converting components to elements or tags, validating the tags and generating files containing the converted content. Files generated may include XML structure files 328, HTML data files 330, and XSL data files 332. XSL data files may include, for example, checklist data 334, alert data 336, aerodynamic data 338 and auxiliary data 340.

Following is a more detailed description of an illustrative embodiment of the conversion process. The initial step in this process is to perform an analysis of the electronic document to determine how the information should be structured when displayed by the interface. The main goal of this analysis is to identify the top-level component(s) of the document structure, the sub-components of the structure; and information that will be included in the content. When the structure is defined, a Document Type Definition (DTD) is created. The DTD is the standard for the structure of the document. The DTD is a text file that defines the components that create the structure of the document, the associated attributes of those components, and the rules for how these components can be nested within output XML/XSL/HTML files. Each type of document (i.e., manual, checklist, etc.) will have its own unique DTD due to the different information contents of those documents.

If the document file contains multiple top-level components, it is broken up into separate document files, each file containing all the information nested within the top-level component. For example, a chapter will be the top-level component of a manual. The sections, sub-sections and content contained within the chapter are in one file. A style sheet, developed specifically for the type of document being processed, is then applied to the content of each file. All sections and associated subsections, graphics, tables, paragraphs, headings, etc. are assigned a specific style, which is maintained throughout the entire conversion process. For example, a section component will be given a style called "sec", and a paragraph will be given a style called "p". Once all components of the documents are assigned a style, the files are then converted into a "well formed" Extensible Markup Language (XML) file, via the generic software application, to define the structure of menu screens. The conversion also creates multiple "well formed" HyperText Markup Language (HTML) or Extensible Stylesheet Language (XSL) to define how the document content is displayed.

The XML file is used to provide the JAVA application with a blueprint of interface menu structures and locations for content within the structure of the interface. The generic conversion process is a software application that analyzes each document file to identify the styles, called structure styles, which will define the high-level structure elements (e.g., chapters), level 1 elements (e.g., sections), and level 2 elements (e.g., sub-sections), and so on as required, in the document. In addition, the application will also identify which style structures contain content. Once the analysis is complete, the style structures are converted into XML structure elements, or tags, and inserted into a single XML file. Attributes are created for each structure element to provide a unique ID number and a title. The ID number is used as an identifier for each structure element, by the JAVA application for creation of the user interface, and for displaying the appropriate content. The title attribute is created from the content of the original document file, and used by the JAVA application to mark the button selections on the interface menu screens. For the structure styles that contain content, the conversion process creates a content element and nests it within the appropriate structure element. An attribute is then created to link each content element to the appropriate HTML or XSL file containing the actual document content (i.e., paragraphs, graphics, tables and/or headings). Each document file is processed in the order the information is sequenced in the overall document, and inserted into a single XML structure file. The generic conversion process then validates the XML structure through comparison with the DTD structure file to ensure that all XML structure elements are valid and properly nested.

In addition to creating the XML structure file, the generic conversion process creates an HTML or XSL file, depending on which mark up language is desired, for each structure element that contains content. The conversion application analyzes the documents and locates the content styles within the document. These can include paragraphs, tables, graphics, hyper-linked strings of characters and headers. The content styles are identified and converted to HTML or XSL elements, or tags. These elements define how the content will be displayed by the interface. For example, any content nested in a "table" element will be presented in a tabular form, and any content nested in a "bold" element will be presented in bold form. The conversion application will take the content, wrap it with the appropriate element, insert it into a "well formed" HTML or XSL file, and name the file according to the source attribute of the structure element it is assigned to.

Figure 4:
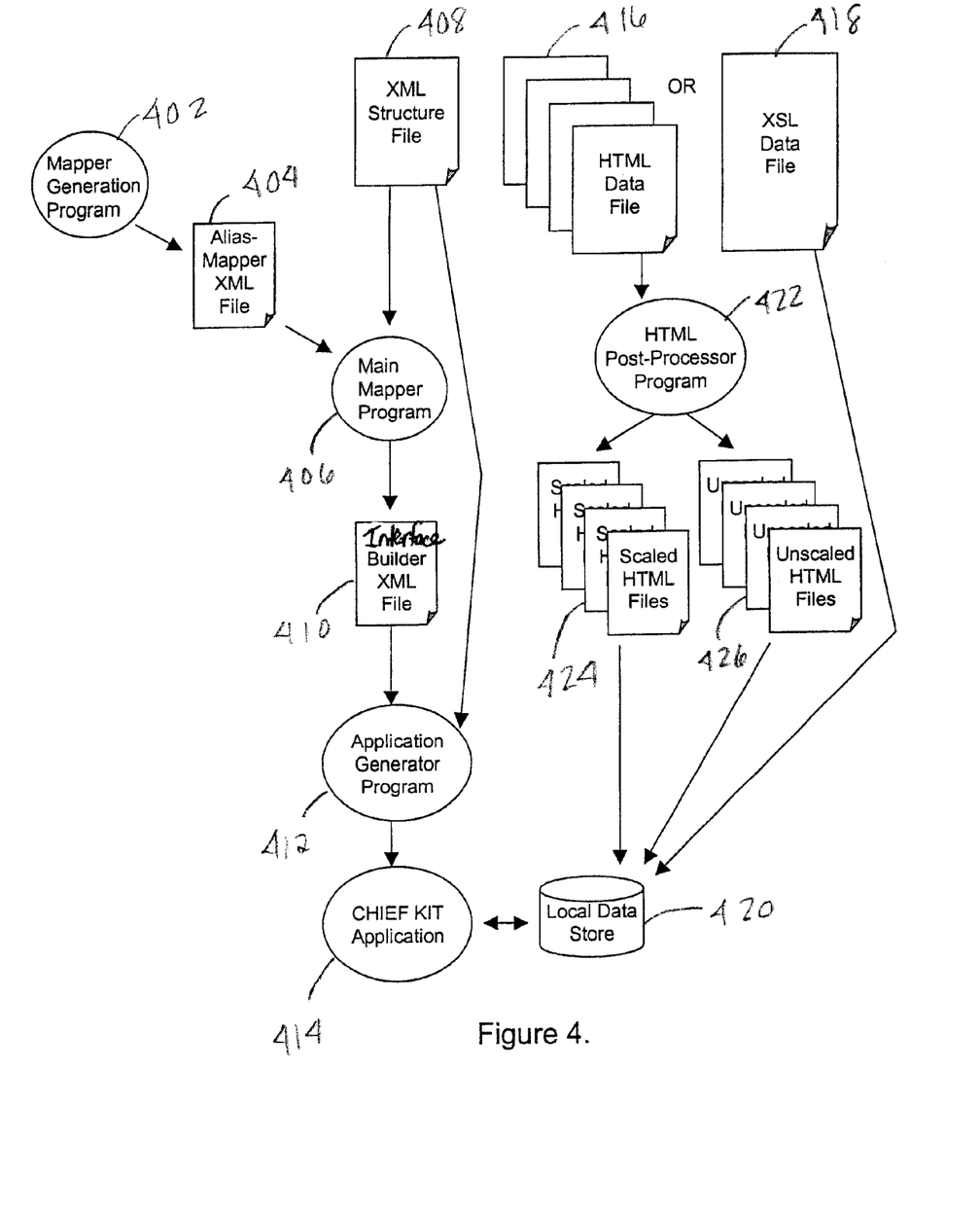
FIG. 4 depicts a post conversion content updating process according to an illustrative embodiment of the invention.

Once the initial conversion process is complete, raw electronic data is taken and the flight kit specific mark up tags are applied to prepare individual files to adhere to the DTD's for both the flight manual and pilot checklists portions of the flight kit application. The marked up files are then fed through a custom LISP program which converts the marked up electronic documents into two valid XML structure documents (one flight manual, one checklists) and many XML files representing leaf content (using the html32.dtd). A JAVA application is then used to convert the XML content files to valid HTML files so they are viewable without the need for a special XML viewer (this step is not necessary if XLS is used as the display mechanism). This JAVA application also allows the content creator to define a maximum limit for graphics size. This is done to reduce the potential for horizontal scrolling when the flight kit application is hosted on a computer with a small display (common in cockpit applications). Next a file is created defining the view and navigation through content in the application. At the same time, another file is created which maps meaningful symbols used in the navigation file to less meaningful symbols used in the structure documents. In this file, the content creator can also define queries which allow easy updating of the navigation file as the content of the structure documents change. FIG. 4 depicts a post conversion content updating process according to an illustrative embodiment of the invention. A map or generation program 402 is implemented to detect content changes and reconfigure the system accordingly. Alias-Mapper XML file 404 links a user interface builder XML file to a file containing particular document content. Alias-mapper XML file 404 is provided to a main mapper program 406, along with an XML structure file 408. The main mapper program 406 acts on a user interface builder XML file 410. User interface builder XML file 410 and XML structure file 408 are processed by application generator program 412. Applications generated by program 412 are provided to flight kit applications 414. HTML data files 416 and XSL data files 418 are stored locally as shown in step 420. Prior to storing HTML data files 416, they are processed by an HTML post-processor program 422, which provides scaled and unscaled HTML files in steps 424 and 426.

An ID to Alias Mapper XML file can be used as a linkage between the user interface builder XML file and the particular structure XML files which contain the unique content for a specific flight manual. This Mapper file defines queries that map variables used to link crucial user interface elements and user interface actions in the user interface builder to relevant content contained in the structure files. The Mapper XML allows easy automation of the task of updating the flight kit content from a new revision of the same flight manual.

At this time, non-textual XML data (e.g., numerical data representing curves on an aerodynamic chart) and a JAVA code module (e.g., a code block representing the calculator algorithm and visual representation of the calculator, following a set API) are added which define a performance data calculator. The flight kit dynamically configures itself based on these files at startup.

Content is received in raw electronic form (i.e., XML and HTML). Content is again marked up and processed using a second custom LISP program. The LISP program output is then run through a second JAVA application. This JAVA application takes the Mapper file mentioned above, executes the defined queries and then makes the relevant changes to account for content/structure changes since the last update. Content is then placed in the same directory as the flight kit application on the host computer. When the flight kit is launched the application can detect that its data has changed and the applications can reconfigure itself in terms of user interface and internal configuration.

The Flight Kit Application

The flight kit application provides an efficient mechanism to display flight manual information to aircrew. The application itself can be based on a common Internet browser metaphor. A user can be provided with multiple means of accessing information (i.e., hierarchical menus, index, table of contents, context sensitive menus) as well as the ability to track his/her own navigation within the application.

The flight kit application software can have the following characteristics:

1. The ability to display flight manuals to pilots in a way that is easy to navigate and manage.
2. The ability to dynamically (within usage sessions) adapt to lighting conditions in the cockpit (day, night, NVG). (illumination binder).
3. The ability to, with minimal effort, plug in new/restructured/edited content and content types.
4. The ability to define, with little effort, ways of linking within and across above mentioned content types.
5. The ability to change with little effort ways of viewing above mentioned content (hierarchical (directory tree/table of contents), direct access (index), sequential access (context sensitive menus).
6. The ability to dynamically (within usage sessions) change font sizes (text binder).
7. Content and application can be size scalable across many mobile and desktop displays.
8. Use of (end user editable) markup language for defining and configuring JAVA Graphical User Interface elements, navigation schemes, and document structure.
9. The ability to use marked up flight manuals not only to provide content for the application but also to derive a structure for application navigation.
10. Use of markup language to define and group curve data used for performance calculations, thereby allowing new calculations to be plugged into the application as they become available.
11. Multiple views of performance calculations (e.g., calculator, nomograms, or other graphical chart formats).
12. The ability to plug other documents not part of the original flight manual into the viewer (e.g., standard operating procedures, forms, manifests, etc.).
13. A history feature which allows users to access previous content (including tree expansion and page scroll state).
14. A bookmark feature, which allows for customized user navigation.
15. Instantaneous retrieval of content based on aircraft performance parameters (if the flight kit application and associated host computer is connected in a read-only mode to the aircraft's data bus, or if input manually by the user).
16. Ability to use the flight kit, such as via plug-in API, as a launching pad for other applications (e.g., moving map, diagnostic alerts, charting applications).
17. Ability to electronically ink forms and annotate electronic documents.
18. Display trend data based on history of aircraft performance parameters.
19. Direct pilot to appropriate content based on alerts and aircraft performance indicators (when the flight kit is used in conjunction with a diagnostic system).

Description of the Flight Kit API

A plug-in framework, preferably written in JAVA programming, acts as a bridge between proprietary component modules and the flight kit application. The API enables 3rd party developers to write reusable modules, which have access to many of the standard the flight kit features. The framework also allows end users to customize which component modules are enabled in the flight kit. The API also provides a seamless and powerful means for developers to build components that take advantage of the flight kit features. Individual component modules may function quite differently, but can share typical interface features provided by the flight kit including:

ability to adjust illumination settings ability to control text customization and look and feel of the flight kit ability to use the flight kit history and navigation functions

Remote Update Server

An exemplary embodiment of the invention provides a system for updating a client's system via an Internet or other network connectivity. The system employs a multi-tiered client server architecture.

Following is a more detailed description of an illustrative embodiment of a server architecture. Content update notifications are broadcast from a central server. Secondary servers, possibly on a fleet by fleet basis, then decide whether the received update notifications are relevant to their flight kit users. These secondary servers then have the ability to add specialized content of their own to the default flight kit content. The secondary servers then determine which the flight kit users need to be upgraded based on stored information concerning the registered clients. The flight kit users would then need to be docked to the secondary server which can then update the content on the user as well as upgrade its own knowledge of the user's status.

Particular programming, style sheet and markup languages have been specified herein. Other languages, however, with the necessary functionality may be used within the spirit and scope of the invention.

While the invention has been described by illustrative embodiments, additional advantages and modifications will occur to those skilled in the art. Therefore, the invention in its broader aspects is not limited to specific details shown and described herein. Modifications, for example, to the computer languages, flight kit content and markup sequence, may be made without departing from the spirit and scope of the invention. Accordingly, it is intended that the invention not be limited to the specific illustrative embodiments, but be interpreted within the full spirit and scope of the appended claims and their equivalents.

What is claimed is:

1. A method in a computer system of generating a cockpit information management and application system comprising:
   structuring content of a flight kit;
   generating an executable software application to produce a cockpit information management aid;
   dynamically generating a user interface based on the flight kit content;
   delivering the structured flight kit content to a user.

2. The method of claim 1 wherein generating an executable software application comprises:
   converting the structured flight kit content into an electronic form; and
   storing the converted structured flight kit content.

3. The method of claim 2 wherein the electronic form is XML.

4. The method of claim 1 wherein structuring the flight kit content comprises:
   defining a structure by identifying top-level components and sub components of flight kit content structure;
   identifying the information that will be included in the flight kit content;
   creating a document type definition file based on the defined structure; and
   applying a style sheet to the structured flight kit content of each document type definition file.

5. The method of claim 4 wherein the document type definition file defines components that create document structure, associated component attributes and rules for how the components can be nested.

6. The method of claim 4 further comprising after applying the style sheet to the structured flight kit content:
   converting the files into a markup language; and
   creating attributes for each structure component to provide a unique identification number and title for creation of the user interface.

7. The method of claim 1 further comprising, via a global network system, remotely performing one or more tasks selected from the group consisting of, updating data and managing applications.

8. The method of claim 7 wherein the tasks are performing continuously.

9. The method of claim 1 further comprising dynamically regenerating the user interface at system run time.

10. The method of claim 1 further comprising:
    dynamically regenerating data by detecting data change;
    parsing existing data; and
    regenerating the user interface to match the parsed data.

11. The method of claim 1 further comprising tracking at least a portion of system use to generate usage data.

12. The method of claim 11 further comprising analyzing the usage data to provide a basis for system improvements.

13. The method of claim 1 further comprising processing raw data via the cockpit information management and application system.

14. A cockpit information system comprising:
    a markup software component to markup flight kit content;
    a storage software content to store marked up flight kit content;
    a delivery software component to deliver flight kit content to a user; and
    a cockpit information navigation software component to apply flight kit content.

15. The cockpit information system of claim 14 wherein the system is portable.

16. The cockpit information system of claim 15 wherein the system is wearable.

17. The computer system of claim 15 wherein structuring the flight kit content comprises:
    defining a structure by identifying top-level components and sub components of flight kit content structure;
    identifying the information that will be included in the flight kit content;
    creating a document type definition file based on the defined structure; and
    applying a style sheet to the structured flight kit content of each document type definition file.

18. The computer system of claim 17 wherein the document type definition file defines components that create document structure, associated component attributes and rules for how the components can be nested.

19. The computer system of claim 17 further comprising after applying the style sheet to the structured flight kit content:
    converting the files into a markup language; and
    creating attributes for each structure component to provide a unique identification number and title for creation of the user interface.

20. The computer system of claim 15 further comprising, via a global network system, remotely performing one or more tasks selected from the group consisting of, updating data and managing applications.

21. The computer system of claim 20 wherein the tasks are performing continuously.

22. The computer system of claim 15 further comprising dynamically regenerating the user interface at system run time.

23. The computer system of claim 15 further comprising:
    dynamically regenerating data by detecting data change;
    parsing existing data; and
    regenerating the user interface to match the parsed data.

24. The computer system of claim 15 further comprising tracking at least a portion of system use to generate usage data.

25. The computer system of claim 24 further comprising analyzing the usage data to provide a basis for system improvements.

26. The computer system of claim 15 further comprising processing raw data via the cockpit information management and application system.

27. The computer system of claim 15 wherein the system is portable.

28. The computer system of claim 27 wherein the system is wearable.

29. A computer system configured to manage and apply cockpit information by a method comprising:

structuring content of a flight kit;

generating an executable software application to produce a cockpit information management aid;

dynamically generating a user interface based on the flight kit content;

delivering the structured flight kit content to a user.

30. The computer system of claim 15 wherein generating an executable software application comprises:

converting the structured flight kit content into an electronic form, and storing the converted structured flight kit content.

31. The computer system of claim 30 wherein the electronic form is XML.

32. A computer readable medium programmed to manage and apply cockpit information by a method comprising:

structuring content of a flight kit;

generating an executable software application to produce a cockpit information management aid;

dynamically generating a user interface based on the flight kit content;

delivering the structured flight kit content to a user.

33. The computer readable medium of claim 32 wherein generating an executable software application comprises:

converting the structured flight kit content into an electronic form (or markup language?); and storing the converted structured flight kit content.

34. The computer readable medium of claim 33 wherein the electronic form is XML.

35. The computer readable medium of claim 32 wherein structuring the flight kit content comprises:

defining a structure by identifying top-level components and sub components of flight kit content structure;

identifying the information that will be included in the flight kit content;

creating a document type definition file based on the defined structure; and applying a style sheet to the structured flight kit content of each document type definition file.

36. The computer readable medium of claim 35 wherein the document type definition file defines components that create document structure, associated component attributes and rules for how the components can be nested.

37. The computer readable medium of claim 35 further comprising after applying the style sheet to the structured flight kit content:

converting the files into a markup language; and creating attributes for each structure component to provide a unique identification number and title for creation of the user interface.

38. The computer readable medium of claim 32 further comprising, via a global network system, remotely performing one or more tasks selected from the group consisting of, updating data and managing applications.

39. The computer readable medium of claim 38 wherein the tasks are performing continuously.

40. The computer readable medium of claim 32 further comprising dynamically regenerating the user interface at system run time.

41. The computer readable medium of claim 32 further comprising:

dynamically regenerating data by detecting data change;

parsing existing data; and regenerating the user interface to match the parsed data.

42. The computer readable medium of claim 32 further comprising tracking at least a portion of system use to generate usage data.

43. The computer readable medium of claim 42 further comprising analyzing the usage data to provide a basis for system improvements.

44. The computer readable medium of claim 32 further comprising processing raw data via the cockpit information management and application system.

* * * * *

UNITED STATES PATENT AND TRADEMARK OFFICE
CERTIFICATE OF CORRECTION

PATENT NO. : 6,606,544 B2
DATED : August 12, 2003
INVENTOR(S) : Floyd A. Glenn III et al.

It is certified that error appears in the above-identified patent and that said Letters Patent is hereby corrected as shown below:

<u>Column 9, line 24, through Column 10, line 65,</u>
Replace the present claims with the following:

--1. A method in a computer system of generating a cockpit information management and application system comprising:
  structuring content of a flight kit;
  generating an executable software application to produce a cockpit information management aid;
  dynamically generating a user interface based on the flight kit content;
  delivering the structured flight kit content to a user.
2. The method of claim 1 wherein generating an executable software application comprises:
  converting the structured flight kit content into an electronic form; and
  storing the converted structured flight kit content.
3. The method of claim 2 wherein the electronic form is XML.
4. The method of claim 1 wherein structuring the flight kit content comprises:
  defining a structure by identifying top-level components and sub components of flight kit content structure;
  identifying the information that will be included in the flight kit content;
  creating a document type definition file based on the defined structure; and
  applying a style sheet to the structured flight kit content of each document type definition file.
5. The method of claim 4 wherein the document type definition file defines components that create document structure, associated component attributes and rules for how the components can be nested.
6. The method of claim 4 further comprising after applying the style sheet to the structured flight kit content:
  converting the files into a markup language; and
  creating attributes for each structure component to provide a unique identification number and title for creation of the user interface.
7. The method of claim 1 further comprising, via a global network system, remotely performing one or more tasks selected from the group consisting of, updating data and managing applications.
8. The method of claim 7 wherein the tasks are performing continuously.
9. The method of claim 1 further comprising dynamically regenerating the user interface at system run time.
10. The method of claim 1 further comprising:
dynamically regenerating data by detecting data change;
parsing existing data; and
regenerating the user interface to match the parsed data.
11. The method of claim 1 further comprising tracking at least a portion of system use to generate usage data.
12. The method of claim 11 further comprising analyzing the usage data to provide a basis for system improvements.
13. The method of claim 1 further comprising processing raw data via the cockpit information management and application system.
14. A cockpit information system comprising:
a markup software component to markup flight kit content;
a storage software content to store marked up flight kit content;
a delivery software component to deliver flight kit content to a user; and
a cockpit information navigation software component to apply flight kit content.

UNITED STATES PATENT AND TRADEMARK OFFICE
CERTIFICATE OF CORRECTION

PATENT NO. : 6,606,544 B2
DATED : August 12, 2003
INVENTOR(S) : Floyd A. Glenn III et al.

It is certified that error appears in the above-identified patent and that said Letters Patent is hereby corrected as shown below:

15. The cockpit information system of claim 14 wherein the system is portable.
16. The cockpit information system of claim 15 wherein the system is wearable.
17. A computer system configured to manage and apply cockpit information by a method comprising:
 structuring content of a flight kit;
 generating an executable software application to produce a cockpit information management aid;
 dynamically generating a user interface based on the flight kit content;
 delivering the structured flight kit content to a user.
18. The computer system of claim 17 wherein generating an executable software application comprises:
 converting the structured flight kit content into an electronic form, and
 storing the converted structured flight kit content.
19. The computer system of claim 18 wherein the electronic form is XML.
20. The computer system of claim 17 wherein structuring the flight kit content comprises:
 defining a structure by identifying top-level components and sub components of flight kit content structure;
 identifying the information that will be included in the flight kit content;
 creating a document type definition file based on the defined structure; and
 applying a style sheet to the structured flight kit content of each document type definition file.
21. The computer system of claim 20 wherein the document type definition file defines components that create document structure, associated component attributes and rules for how the components can be nested.
22. The computer system of claim 20 further comprising after applying the style sheet to the structured flight kit content:
 converting the files into a markup language; and
 creating attributes for each structure component to provide a unique identification number and title for creation of the user interface.
23. The computer system of claim 17 further comprising, via a global network system, remotely performing one or more tasks selected from the group consisting of, updating data and managing applications.
24. The computer system of claim 23 wherein the tasks are performing continuously.
25. The computer system of claim 17 further comprising dynamically regenerating the user interface at system run time.
26. The computer system of claim 17 further comprising:
dynamically regenerating data by detecting data change;
parsing existing data; and
regenerating the user interface to match the parsed data.

UNITED STATES PATENT AND TRADEMARK OFFICE
CERTIFICATE OF CORRECTION

PATENT NO.    : 6,606,544 B2
DATED         : August 12, 2003
INVENTOR(S)   : Floyd A. Glenn III et al.

It is certified that error appears in the above-identified patent and that said Letters Patent is hereby corrected as shown below:

27. The computer system of claim 17 further comprising tracking at least a portion of system use to generate usage data.
28. The computer system of claim 27 further comprising analyzing the usage data to provide a basis for system improvements.
29. The computer system of claim 17 further comprising processing raw data via the cockpit information management and application system.
30. The computer system of claim 17 wherein the system is portable.
31. The computer system of claim 30 wherein the system is wearable.
32. A computer readable medium programmed to manage and apply cockpit information by a method comprising:
   structuring content of a flight kit;
   generating an executable software application to produce a cockpit information management aid;
   dynamically generating a user interface based on the flight kit content;
   delivering the structured flight kit content to a user.
33. The computer readable medium of claim 32 wherein generating an executable software application comprises:
   converting the structured flight kit content into an electronic form (or markup language?); and
   storing the converted structured flight kit content.
34. The computer readable medium of claim 33 wherein the electronic form is XML.
35. The computer readable medium of claim 32 wherein structuring the flight kit content comprises:
   defining a structure by identifying top-level components and sub components of flight kit content structure;
   identifying the information that will be included in the flight kit content;
   creating a document type definition file based on the defined structure; and
   applying a style sheet to the structured flight kit content of each document type definition file.
36. The computer readable medium of claim 35 wherein the document type definition file defines components that create document structure, associated component attributes and rules for how the components can be nested.
37. The computer readable medium of claim 35 further comprising after applying the style sheet to the structured flight kit content:
   converting the files into a markup language; and
   creating attributes for each structure component to provide a unique identification number and title for creation of the user interface.
38. The computer readable medium of claim 32 further comprising, via a global network system, remotely performing one or more tasks selected from the group consisting of, updating data and managing applications.
39. The computer readable medium of claim 38 wherein the tasks are performing continuously.
40. The computer readable medium of claim 32 further comprising dynamically regenerating the user interface at system run time.

UNITED STATES PATENT AND TRADEMARK OFFICE
CERTIFICATE OF CORRECTION

PATENT NO. : 6,606,544 B2
DATED : August 12, 2003
INVENTOR(S) : Floyd A. Glenn III et al.

It is certified that error appears in the above-identified patent and that said Letters Patent is hereby corrected as shown below:

41. The computer readable medium of claim 32 further comprising:
dynamically regenerating data by detecting data change;
parsing existing data; and
regenerating the user interface to match the parsed data.
42. The computer readable medium of claim 32 further comprising tracking at least a portion of system use to generate usage data.
43. The computer readable medium of claim 42 further comprising analyzing the usage data to provide a basis for system improvements.
44. The computer readable medium of claim 32 further comprising processing raw data via the cockpit information management and application system.--

Signed and Sealed this

Twenty-fifth Day of November, 2003

JAMES E. ROGAN
*Director of the United States Patent and Trademark Office*